United States Patent
Chen et al.

(10) Patent No.: US 9,659,256 B2
(45) Date of Patent: May 23, 2017

(54) NETWORK SERVICE RECOMMENDATION METHOD AND APPARATUS

(71) Applicant: TENCENT TECHNOLOGY (SHENZHEN) COMPANY LIMITED, Shenzhen, Guangdong (CN)

(72) Inventors: Rong Chen, Shenzhen (CN); Yong Wei, Shenzhen (CN); Xiaoping Lai, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/113,670

(22) PCT Filed: May 19, 2015

(86) PCT No.: PCT/CN2015/079311
§ 371 (c)(1),
(2) Date: Jul. 22, 2016

(87) PCT Pub. No.: WO2015/176652
PCT Pub. Date: Nov. 26, 2015

(65) Prior Publication Data
US 2017/0068900 A1    Mar. 9, 2017

(30) Foreign Application Priority Data
May 20, 2014 (CN) .......................... 2014 1 0213553

(51) Int. Cl.
*G06N 5/02* (2006.01)
*G06F 17/00* (2006.01)
(Continued)

(52) U.S. Cl.
CPC ............. *G06N 7/005* (2013.01); *H04L 41/50* (2013.01)

(58) Field of Classification Search
None
See application file for complete search history.

(56) References Cited

U.S. PATENT DOCUMENTS 9,122,910 B2 *   9/2015  Cha .................... G06K 9/00677
9,519,684 B2 * 12/2016  Xu ....................... G06F 17/3053
(Continued)

FOREIGN PATENT DOCUMENTS

CN         102316166 A   *  1/2012 ............. H04L 67/22
CN         102957722       *  3/2013
(Continued)

OTHER PUBLICATIONS

Written Opinion of the International Searching Authority for International Application No. PCT/CN2015/079311, mailed Aug. 3, 2015, 3 pages.
(Continued)

*Primary Examiner* — Paulinho E Smith
(74) *Attorney, Agent, or Firm* — Knobbe Martens Olson & Bear LLP

(57) ABSTRACT

The present disclosure discloses a network service recommendation method and apparatus, which belong to a network data analysis technology. The method includes: retrieving, according to a historical browsing record of a user during use of a network service, a label corresponding to each network service used by the user; determining, according to a preset label-topic correspondence, and by using the label corresponding to each network service used by the user, first n topics corresponding to the user; acquiring, according to a preset topic-network service correspondence, respective corresponding recommended network service lists of the first n topics, the recommended network service list of each topic including at least one network service; and recommending a network service to the user
(Continued)

according to the respective corresponding recommended network service lists of the first n topics.

16 Claims, 8 Drawing Sheets

(51) Int. Cl.
  *G06N 7/00* (2006.01)
  *H04L 12/24* (2006.01)

(56) References Cited

U.S. PATENT DOCUMENTS

| | | | | |
|---|---|---|---|---|
| 9,536,285 B2* | 1/2017 | Wang | ................ | H04N 1/00137 |
| 2011/0238608 A1* | 9/2011 | Sathish | ................ | G06Q 30/02 |
| | | | | 706/47 |
| 2012/0302270 A1 | 11/2012 | Sathish | | |
| 2013/0137463 A1* | 5/2013 | Busch | ................ | H04W 4/02 |
| | | | | 455/456.3 |
| 2016/0155059 A1* | 6/2016 | Ruffner | ................ | G06F 17/30873 |
| | | | | 706/11 |
| 2016/0306881 A1* | 10/2016 | Chen | ................ | G06F 17/30766 |
| 2016/0379268 A1* | 12/2016 | Song | ................ | G06Q 30/0241 |
| | | | | 705/14.53 |

FOREIGN PATENT DOCUMENTS

| | | | |
|---|---|---|---|
| CN | 102957722 A | | 3/2013 |
| CN | 103595747 | * | 2/2014 |
| CN | 103595747 A | | 2/2014 |
| CN | 103761286 | * | 4/2014 |
| CN | 103761286 A | | 4/2014 |

OTHER PUBLICATIONS

International Search Report for International Application No. PCT/CN2015/079311, mailed Aug. 3, 2015, 2 pages.

\* cited by examiner

NETWORK SERVICE RECOMMENDATION METHOD AND APPARATUS

CROSS-REFERENCE TO RELATED APPLICATIONS

This application claims priority to, and is a 371 National Phase application of, PCT/CN2015/079311, filed on May 19, 2015. This application further claims priority to Chinese Patent Application No. 201410213553.5 filed on May 20, 2014 by Tencent Technology (Shenzhen) Co., Ltd. and titled "NETWORK SERVICE RECOMMENDATION METHOD AND APPARATUS". The above-recited applications are hereby incorporated by reference in their entirety under 37 CFR 1.57.

FIELD OF THE TECHNOLOGY

The present disclosure relates to the network data analysis technologies, and in particular, to a network service recommendation method and apparatus.

BACKGROUND OF THE DISCLOSURE

With the development of the network era, network services prevail in people's daily lives, and network services at least include: online videos, online music, online news, and online shopping.

Online videos are used as an example. Current video recommendation strategies include: an association rule (AR) mining strategy and a Collaborative Filtering (CF) strategy. It is assumed in both AR and CF that an entire user group has same movie watching interest. When a video is recommended to one user, first n videos of a same type that are watched by other users are recommended to the user, where N>1, and N is an integer. For example, because it is assumed that movie watching interest of an entire user group is action movies, when a video is recommended to user A, first 10 movies in action movies watched by others are recommended to user A.

During implementation of the present disclosure, the inventor finds that the foregoing technology at least has the following problem: During an actual operation, each user has different subjective interest in a network service, and a network service recommended according to an interest standard of an entire user group does not necessarily meet interest of a single user in a network service, so that an accuracy rate of whether a network service, recommended by a backend system according to an interest standard of an entire user group, meets interest of a user in a network service is reduced.

SUMMARY

To solve a problem that an accuracy rate of recommending a network service to a single user is reduced because a backend system recommends a network service to a single user according to an interest standard of an entire user group, embodiments of the present invention provide a network service recommendation method and apparatus. The technical solutions are as follows:

According to a first aspect of the present disclosure, a network service recommendation method is provided, the method including:

retrieving, according to a historical browsing record of a user during use of a network service, a label corresponding to each network service used by the user;

determining, according to a label-topic correspondence, and by using the label corresponding to each network service used by the user, first n topics corresponding to the user, the first n topics being top n topics according to a descending order of browsing probability of the user, and n being a positive integer;

acquiring, according to a topic-network service correspondence, respective corresponding recommended network service lists of the first n topics, the recommended network service list of each topic including at least one network service; and recommending a network service to the user according to the respective corresponding recommended network service lists of the first n topics.

According to a second aspect of the present disclosure, a network service recommendation apparatus is provided, the apparatus including:

a retrieval module, configured to retrieve, according to a historical browsing record of a user during use of a network service, a label corresponding to each network service used by the user;

a topic determination module, configured to determine, according to a label-topic correspondence, and by using the label that is retrieved by the retrieval module and corresponds to each network service used by the user, first n topics corresponding to the user, the first n topics being top n topics according to a descending order of browsing probability of the user, and n being a positive integer;

an acquisition module, configured to acquire, according to a topic-network service correspondence, respective corresponding recommended network service lists of the first n topics determined by the topic determination module, the recommended network service list of each topic including at least one network service; and a recommendation module, configured to recommend a network service to the user according to the respective corresponding recommended network service lists, of the first n topics, acquired by the acquisition module.

The beneficial effects brought by the technical solutions in provided in the embodiments of the present invention are:

First n topics corresponding to a user are obtained according to a historical browsing record of the user, where the first n topics are top n topics according to a descending order of browsing probability of the user, and can reflect interest of the user during use of a network service; by using recommended network service lists corresponding to the first n topics, a network service is further recommended to a user according to recommended network service lists corresponding to the first n topics; a problem that an accuracy rate of recommending a network service to a single user is reduced because a backend system recommends a network service to a single user according to an interest standard of an entire user group is solved; and an accuracy rate of recommending a network service to a single user is increased.

BRIEF DESCRIPTION OF THE DRAWINGS

To describe the technical solutions in the embodiments of the present invention more clearly, drawings required in description of the embodiments will be introduced simply in the following. It is obvious that the drawings in the following description are only some of the embodiments of the present invention, and a person of ordinary skill in the art may obtain other drawings based on the drawings without creative efforts.

DESCRIPTION OF EMBODIMENTS

To make the objectives, technical solutions, and advantages in the present invention clearer, the following further describes the implementation manners of the present invention in detail with reference to the accompanying drawings.

In the network service recommendation methods provided in the embodiments of the present invention, a network service at least includes: an online video, online music, online reading, and online shopping. A video in the online video may be: a movie, a television program, a music video (MV), a microcinema video, or a video uploaded by a netizen. The online reading may be: browsing of news and online reading of novels. An online video is mainly used as an example for description below.

Figure 1:
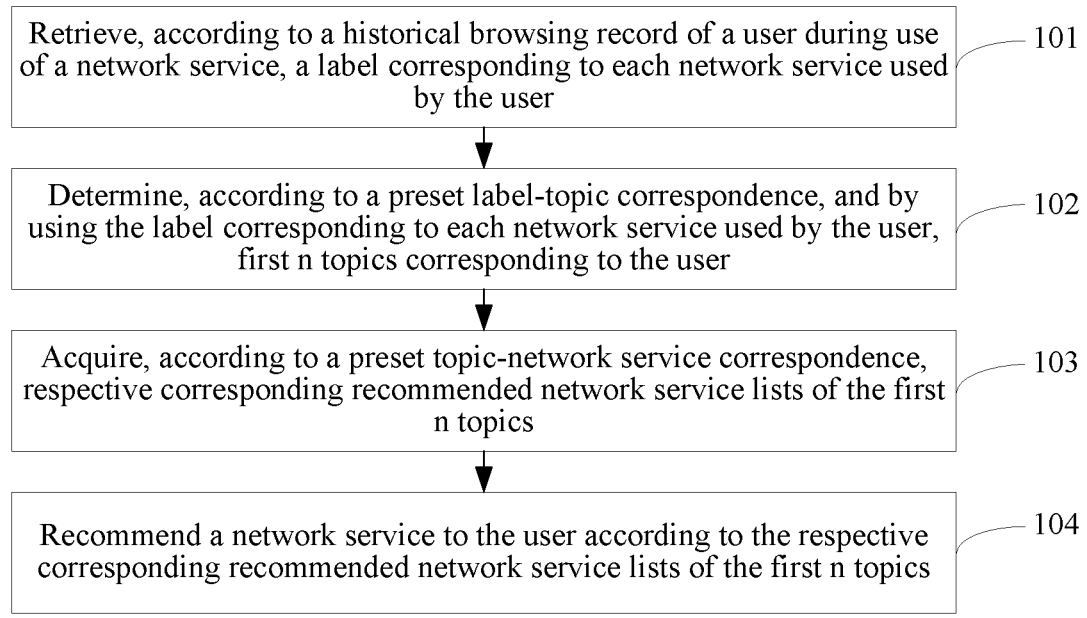
FIG. 1 is a method flowchart of a network service recommendation method provided in an embodiment of the present invention.

Referring to FIG. 1, FIG. 1 is a method flowchart of a network service recommendation method provided in an embodiment of the present invention. The network service recommendation method includes:

Step 101: Retrieve, according to a historical browsing record of a user during use of a network service, a label corresponding to each network service used by the user.

Step 102: Determine, according to a preset label-topic correspondence, and by using the label corresponding to each network service used by the user, first n topics corresponding to the user.

The first n topics are top n topics according to a descending order of browsing probability of the user, n being a positive integer.

Step 103: Acquire, according to a preset topic-network service correspondence, respective corresponding recommended network service lists of the first n topics.

The recommended network service list of each topic includes at least one network service.

Step 104: Recommend a network service to the user according to the respective corresponding recommended network service lists of the first n topics.

In conclusion, for the network service recommendation method provided in this embodiment, first n topics corresponding to a user are obtained according to a historical browsing record of the user, where the first n topics are top n topics according to a descending order of browsing probability of the user, and can reflect interest of the user during use of a network service; by using recommended network service lists corresponding to the first n topics, a network service is further recommended to a user according to recommended network service lists corresponding to the first n topics; a problem that an accuracy rate of recommending a network service to a single user is reduced because a backend system recommends a network service to a single user according to an interest standard of an entire user group is solved; and an accuracy rate of recommending a network service to a single user is increased.

The network service recommendation method provided in the embodiment of the present invention mainly includes 2 processes:

first, a preprocessing process of topic mining, where:

a server obtains, by using the preprocessing process:

1. a topic-label correspondence, and a probability that each label belongs to a corresponding topic; and 2. a topic-network service correspondence, and a probability that each network service belongs to a corresponding topic; and second, a process of recommending a network service by using a historical browsing record of a user and two mined correspondences.

Figure 2:
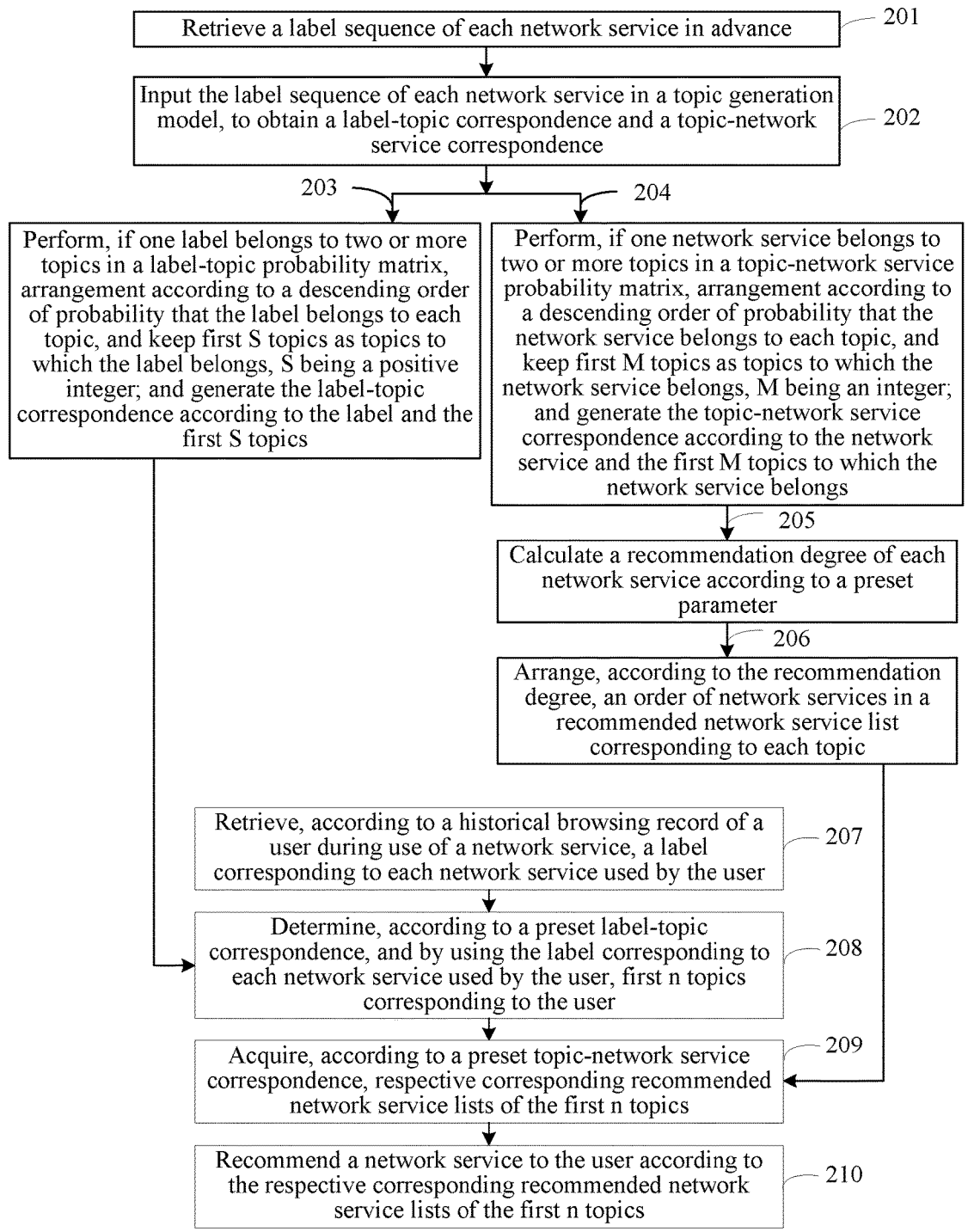
FIG. 2 is a method flowchart of a network service recommendation method provided in another embodiment of the present invention.

That is, the server performs the process of recommending a network service by using the historical browsing record of the user and the topic-label correspondence and the topic-network service correspondence that are mined in advance. For details, reference may be made to the embodiment in FIG. 2:

Referring to FIG. 2, FIG. 2 is a method flowchart of a network service recommendation method provided in another embodiment of the present invention. In this embodiment, an example in which the network service recommendation method is applied to a server is used as an example for description. The network service recommendation method includes:

Step 201: Retrieve a label sequence of each network service in advance.

The label sequence of each network service includes at least one label corresponding to the network service.

The network service here is described by using an online video as an example. A server retrieves a label corresponding to an online video watched by each user, and obtains a label sequence of each online video corresponding. The online video includes: a movie, a television program, an MV, a microcinema video or a video uploaded by a netizen.

For example, the online video is a movie. The movie may be: Captain America, Lock, Stock and Two Smoking Barrels, Running Out of Time, Infernal Affairs, and A Simple Life, and a label sequence corresponding to each movie may be:

Captain America { Chris Evans, action};

Lock, Stock and Two Smoking Barrels {Jason Statham, comedy};

Running Out of Time {Andy Lau, action};

Infernal Affairs {Andy Lau, action}; and

A Simple Life {Andy Lau, drama}.

The label in the label sequence here includes: a lead role, a movie genre, a director, a production region, and a language. In addition, the label in the label sequence may further include, but is not limited to, movie watching experience, a role skill, a public comment, a plot attraction, an audio/visual attraction, and a well-known role that was played by each lead role. For example, the label in the label sequence of the movie Infernal Affairs may include: {Andy Lau, action, Andrew Lau, Hongkong (China), Cantonese, Chinese, movie watching experience: the struggle between us and the enemy, a role skill: an undercover agent, a public comment: plots are well connected, a plot attraction: the struggle between the police and the gangsters, an audio/visual attraction: great splicing of pictures and great background music, and a lead role that was played by Andy Lau: Zhao Erhu in The Warlords}.

The content in the label sequence provided in the embodiment of the present disclosure is not specifically limited, as long as the content can be used to implement the network service recommendation method.

Step 202: Input the label sequence of each network service in a topic generation model, to obtain a label-topic correspondence and a topic-network service correspondence.

That the server inputs the label sequence of each network service in a topic generation model, to obtain a label-topic correspondence and a topic-network service correspondence specifically includes:

Step 202a: The server inputs the label sequence of each network service in a latent Dirichlet allocation (LDA) model, to obtain a label-topic probability matrix and a topic-network service probability matrix.

The label-topic probability matrix includes at least one topic, a label corresponding to each topic, and a probability that each label belongs to a corresponding topic.

The topic-network service probability matrix includes at least one topic, a network service corresponding to each topic, and a probability that each network service belongs to a corresponding topic.

Step 202b: The server generates the label-topic correspondence according to the label-topic probability matrix.

Step 202c: The server generates the topic-network service correspondence according to the topic-network service probability matrix.

Figure 3:
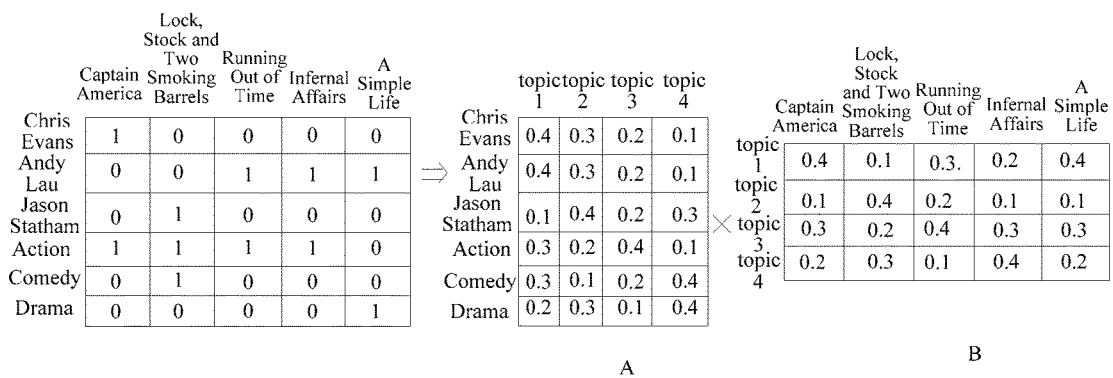
FIG. 3 is a diagram of an output effect of a topic generation model provided in another embodiment of the present invention.

For example, referring to FIG. 3, the label sequences of the movies Captain America. Lock, Stock and Two Smoking Barrels, Infernal Affairs, Running Out of Time, and A Simple Life in Step 201 are input in the topic generation model. As shown on the left side of the arrow in FIG. 3, the label sequences of the movies Captain America, Lock, Stock and Two Smoking Barrels, Running Out of Time, Infernal Affairs, and A Simple Life and the corresponding movies are represented in the form of a "6*5" matrix. That is, the rows in the matrix separately represent the labels: Chris Evans, Jason Statham, Andy Lau, comedy, action, and drama; and the columns of the matrix separately represent the movies: Captain America, Lock, Stock and Two Smoking Barrels, Running Out of Time, Infernal Affairs, and A Simple Life. The matrix is input in the topic generation model to be divided into two matrices, a "6*4" matrix A and a "4*5" matrix B on the right side of the arrow in FIG. 3.

The matrix A includes: at least one topic, a label corresponding to each topic, and a probability that each label corresponds to a topic. That is, the rows of the matrix A separately represent labels: the labels in the label sequences corresponding to the movies in Step 201, and the columns of the matrix A separately represent mined topics: topic1 to topic4. The data in the matrix A is a probability of a topic corresponding to each label.

The matrix B includes: at least one topic, an online video corresponding to each topic, and a probability that each online video belongs to a corresponding topic. That is, the rows of the matrix B separately represent topics: topic1 to topic4. The columns of the matrix B separately represent movies: Captain America, Lock, Stock and Two Smoking Barrels, Running Out of Time, Infernal Affairs, and A Simple Life, and the data in the matrix B is a probability that each online video belongs to a corresponding topic.

In the matrix shown on the left side of the arrow in FIG. 3 here, the value of the movie corresponding to each label represents whether the label is a label in the corresponding movie, if yes, it is marked as 1; and if not, it is marked as 0. A distribution rule of the probability values in the matrix A is: a sum of probability values of the topics corresponding to the labels in the row is 1, and a distribution rule of the probability values in the matrix B is: a sum of the probability values that each movie belongs to a corresponding topic in the column is 1. The probability values in the matrix A and matrix B are adjusted according to the number of the topics, so as to ensure that in the matrix A, a sum of probabilities in each row is finally 1, and in the matrix B, a sum of probabilities of each column is finally 1. The probabilities of the matrix A and the matrix B may be determined according to duration of browsing or the number of times of browsing, and are adjusted according to the number of mined topics. The mined "topic" may be regarded as a class mined by using an algorithm.

The "at least one topic, a label corresponding to each topic, and a probability that each label belongs to a corresponding topic" and the "at least one topic, a network service corresponding to each topic, and a probability that each network service belongs to a corresponding topic" provided in the embodiment of the present invention are represented, for example, by the matrix A and the matrix B obtained above, and are not specifically limited, as long as the network recommendation method provided in the present disclosure is implemented.

In the embodiment provided in the present disclosure, the label sequence of each network service is input in the topic generation model, that is, at least one topic, a label corresponding to each topic, and a probability that each label belongs to a corresponding topic, and at least one topic, a network service corresponding to each topic, and a probability that each network service belongs to a corresponding topic are obtained based on an LDA and according to a relationship between each movie and a topic.

Because each label may belong to many topics, for simplification, optionally:

Step 203: Perform, if one label belongs to two or more topics in a label-topic probability matrix, arrangement according to a descending order of probability that a label belongs to each topic, and keep first S topics as topics to which the label belongs, S being a positive integer; and generate the label-topic correspondence according to the label and the first S topics.

Here the matrix A shown on the right side of the arrow in Step 202 in FIG. 3 is used as an example for description. The topics to which the label in the matrix A belongs are arranged according to a descending order of probability, and first 2 topics are kept as topics to which the label belongs, thereby obtaining that the label "Chris Evans" belongs to the topics topic1 (the corresponding probability is 0.4) and topic2 (the corresponding probability is 0.3), the label "Andy Lau" belongs to the topics topic1 (the corresponding probability is 0.4) and topic2 (the corresponding probability is 0.3), the label "Jason Statham" belongs to the topics topic2 (the corresponding probability is 0.4) and topic4 (the corresponding probability is 0.3), the label "action" belongs to the topics topic1 (the corresponding probability is 0.3) and topic3 (the corresponding probability is 0.4), the label "comedy" belongs to the topics topic1 (the corresponding probability is 0.3) and topic4 (the corresponding probability is 0.4), and the label "drama" belongs to the topics topic2 (the corresponding probability is 0.3) and topic4 (the corresponding probability is 0.4).

It is obtained from the above that the label-topic correspondence is as follows:

The topic topic1 includes: "Chris Evans", "Andy Lau", "action", and "comedy";

The topic topic2 includes: "Chris Evans", "Andy Lau", "Jason Statham", and "drama";

The topic topic3 includes: "action"; and

The topic topic4 includes: "Jason Statham", "comedy", and "drama".

Similarly, because each network service may belong to many topics, for simplification, optionally:

Optionally, Step 204: Perform, if one network service belongs to two or more topics in the topic-network service probability matrix, arrangement according to a descending order of probability that a network service belongs to each topic, and keep first M topics as topics to which the network service belongs, where M≥1 and M is an integer; and generate the topic-network service correspondence according to the network service and the first M topics to which the network service belongs.

Here, the matrix B shown on the right side of the arrow in FIG. 3 in Step 202 is used as an example for description. Arrangement is performed according to a descending order of probability that a network service belongs to each topic in the matrix B, and first 2 topics are kept as topics to which the network service belongs, thereby obtaining that, the movie Captain America belongs to the topics topic1 (the corresponding probability is 0.4) and topic3 (the corresponding probability is 0.3), the movie Lock, Stock and Two Smoking Barrels belongs to the topics topic2 (the corresponding probability is 0.4) and topic4 (the corresponding probability is 0.3), the movie Running Out of Time belongs to the topics topic1 (the corresponding probability is 0.3) and topic3 (the corresponding probability is 0.4), the movie Infernal Affairs belongs to the topics topic3 (the corresponding probability is 0.3) and topic4 (the corresponding probability is 0.4), and the movie A Simple Life belongs to the topics topic1 (the corresponding probability is 0.4) and topic3 (the corresponding probability is 0.3).

It is obtained from the above that the topic-network service correspondence is as follows:

The topic topic1 includes: Captain America, Running Out of Time, and A Simple Life;

The topic topic2 includes: Lock, Stock and Two Smoking Barrels;

The topic topic3 includes: Captain America, Running Out of Time, Infernal Affairs, and A Simple Life; and The topic topic4 includes: Lock, Stock and Two Smoking Barrels, and Infernal Affairs.

Here Step 203 and Step 204 are based on Step 202, and the number of topics corresponding to each label and the number of topics corresponding to each network service obtained in Step 202 are separately selected according to a descending order of probability value, so that data obtained in Step 203 and Step 204, as compared with the data in Step 202 that has not been arranged in order and selected, can further reflect interest and preference of a user when the user watches movies.

Step 205: Calculate a recommendation degree of each network service according to a preset parameter.

The preset parameter includes: at least one of a probability that the network service belongs to a corresponding topic, the number of times of browsing corresponding to the network service, a public rating of the network service, and duration that the network service has been released.

Specifically, that the server calculates a recommendation degree of each network service according to a preset parameter is as follows:

For example, the server acquires in advance at least one of a topic to which each movie belongs, a probability corresponding to a topic to which each movie belongs, the number of times of browsing corresponding to the network service, a public rating of the network service, and duration that the network service has been released. That is, with reference to Step 204, the server acquires in advance that Captain America, Running Out of Time, and A Simple Life belong to the topic topic1, and the corresponding probabilities are: Captain America 0.4, Running Out of Time 0.3, and A Simple Life 0.4; the server acquires in advance that Lock, Stock and Two Smoking Barrels belongs to the topic topic2, and the corresponding probability is 0.4; the server acquires in advance that Captain America, Running Out of Time, Infernal Affairs, and A Simple Life belong to the topic topic3, and the corresponding probabilities are: Captain America 0.3, Running Out of Time 0.4, Infernal Affairs, 0.3, and A Simple Life 0.3; and the server acquires in advance that Lock, Stock and Two Smoking Barrels and Infernal Affairs belong to the topic topic4, and the corresponding probabilities are: Lock, Stock and Two Smoking Barrels 0.3 and Infernal Affairs 0.4.

In topic 1:

The number of times that Captain America is browsed is 8, the public rating is 6.2, and the release duration is: 3 years (released on Sep. 9, 2011).

The number of times that is Running Out of Time browsed is 8, the public rating is 8.3, and the release duration is: 15 years (released on Sep. 23, 1999).

The number of times that A Simple Life is browsed is 7, the public rating is 7.0, and the release duration is: 2 years (released on Mar. 8, 2012).

In topic2:

The number of times that Lock, Stock and Two Smoking Barrels is browsed is 10, the public rating is 9.1, and the release duration is: 16 years (released on Aug. 28, 1998).

In topic3:

The number of times that Captain America is browsed is 8, the public rating is 6.2, and the release duration is: 3 years (released on Sep. 9, 2011).

The number of times that Running Out of Time is browsed is 8, the public rating is 8.3, and the release duration is: 15 years (released on Sep. 23, 1999).

The number of times that A Simple Life is browsed is 7, the public rating is 7.0, and the release duration is: 2 years (released on Mar. 8, 2012).

The number of times that Infernal Affairs is browsed is 10, the public rating is 8.8, and the release duration is: 12 years (released on Dec. 12, 2002).

In topic4:

The number of times that Lock, Stock and Two Smoking Barrels is browsed is 10, the public rating is 9.1, and the release duration is: 16 years (released on Aug. 28, 1998).

The number of times that Infernal Affairs is browsed is 10, the public rating is 8.8, and the release duration is: 12 years (released on Dec. 12, 2002).

It is assumed that a time attenuation factor is set according to release duration, so that for a movie within 10 years, release duration is reduced to 10% according to the release duration, and for a movie over 10 years, release duration is reduced to 1% according to the release duration.

The recommendation degree of each movie in topic1:

The recommendation degree of Captain America is: 0.4*8*6.2*0.3=5.952.

The recommendation degree of Running Out of Time is: 0.3*8*8.3*0.15=2.988.

The recommendation degree of A Simple Life is: 0.4*7*7.0*0.2=3.92.

The recommendation degree of each movie in topic2:

The recommendation degree of Lock, Stock and Two Smoking Barrels is: 0.4*10*9.1*0.16=5.824.

The recommendation degree of each movie in topic3:

The recommendation degree of Captain America is: 0.3*8*6.2*0.3=4.464.

The recommendation degree of Running Out of Time is: 0.4*8*8.3*0.15=3.984.

The recommendation degree of Infernal Affairs is: 0.3*10*8.8*0.12=3.168.

The recommendation degree of A Simple Life is: 0.3*7*7.0*0.2=2.94.

The recommendation degree of each movie in topic4:

The recommendation degree of Lock, Stock and Two Smoking Barrels is: 0.3*10*9.1*0.16=4.368.

The recommendation degree of Infernal Affairs is: 0.4*10*8.8*0.12=4.224.

The public rating of the network service here may be obtained through statistics according to a rating result of each user after movie watching, or may be obtained through commenting by professionals, which is not limited in the embodiment provided in the present disclosure.

Step 206: Arrange an order of network services in a recommended network service list corresponding to each topic according to a recommendation degree.

Arrange an order according to the recommendation degree of each movie in the topic topic1, to obtain the recommended network service list corresponding to topic1, as shown in Table 1:

TABLE 1

| Rank | Movie | Recommendation degree |
|---|---|---|
| 1 | Captain America | 5.952 |
| 2 | A Simple Life | 3.92 |
| 3 | Running Out of Time | 2.988 |

As shown in Table 1, the movie Captain America ranks the first in the topic topic1, and the recommendation degree is 5.952; the movie A Simple Life ranks the second in the topic topic1, and the recommendation degree is 3.92; and the movie Running Out of Time ranks the third in the topic topic1, and the recommendation degree is 2.988.

Arrange an order according to the recommendation degree of each movie in the topic topic2, to obtain the recommended network service list corresponding to topic2, as shown in Table 2:

TABLE 2

| Rank | Movie | Recommendation degree |
|---|---|---|
| 1 | Lock, Stock and Two Smoking Barrels | 5.824 |

As shown in Table 2, the movie Lock, Stock and Two Smoking Barrels ranks the first in the topic topic2, and the recommendation degree is 5.824.

Arrange an order according to the recommendation degree of each movie in the topic topic3, to obtain the recommended network service list corresponding to topic3, as shown in Table 3:

TABLE 3

| Rank | Movie | Recommendation degree |
|---|---|---|
| 1 | Captain America | 4.464 |
| 2 | Running Out of Time | 3.984 |
| 3 | Infernal Affairs | 3.168 |
| 4 | A Simple Life | 2.94 |

As shown in Table 1, the movie Captain America ranks the first in the topic topic3, and the recommendation degree is 4.464; the movie Running Out of Time ranks the second in the topic topic3, and the recommendation degree is 3.984; the movie Infernal Affairs ranks the third in the topic topic3, and the recommendation degree is 3.168; and the movie A Simple Life ranks the fourth in the topic topic3, and the recommendation degree is 2.94.

Arrange an order according to the recommendation degree of each movie in topic topic4, to obtain the recommended network service list corresponding to topic4, as shown in Table 4:

TABLE 4

| Rank | Movie | Recommendation degree |
|---|---|---|
| 1 | Lock, Stock and Two Smoking Barrels | 4.368 |
| 2 | Infernal Affairs | 4.224 |

As shown in Table 4, the movie Lock, Stock and Two Smoking Barrels ranks the first in the topic topic4, and the recommendation degree is 4.368; and the movie Infernal Affairs ranks the second in the topic topic4, and the recommendation degree is 4.224.

Here Steps 201 to 206 are a preprocessing process when the server recommends a corresponding movie to each user. It should be noted that, the foregoing process does not need to be performed once in every recommendation process, and only needs to be completed before a recommendation process, for example, is performed before a recommendation service is provided, or, is performed once every predetermined time interval.

A process of recommending a network service to a user by using two correspondences obtained in advance is provided below:

Step 207: Retrieve, according to a historical browsing record of a user during use of a network service, a label corresponding to each network service used by the user.

Specifically, that the server retrieves, according to a historical browsing record of a user during use of a network service, a label corresponding to each network service used by the user may include:

a. The server determines a network service, meeting an effective browsing condition, in the historical browsing record.

The effective browsing condition includes that: browsing duration exceeds predetermined duration, and/or, the number of times of browsing exceeds a predetermined number of times.

For example, the server selects a movie that is watched by the user and exceeds 20 minutes as a movie that meets the effective browsing condition.

For another example, the server selects a movie that the user has watched more than 3 times as a movie that meets the effective browsing condition.

In this embodiment, that browsing duration exceeds predetermined duration is used as a condition to select a network service meeting an effective browsing condition, which is, however, not specifically limited.

b. The server retrieves a label corresponding to the network service meeting the effective browsing condition.

Here, the server retrieves a historical browsing record when a user watches online videos, where online videos in the historical browsing record are, for example, Blind Detective, Firestorm, Captain America 2, and You Are the Apple of My Eye, and the retrieved labels corresponding to the movies may be:

Blind Detective {Andy Lau, action};

Firestorm {Andy Lau, action};

Captain America 2 {Chris Evans, action}; and

You Are the Apple of My Eye {Ko Chen-tung, drama}.

Step 208: Determine, according to a preset label-topic correspondence, and by using the label corresponding to each network service used by the user, first n topics corresponding to the user.

The first n topics are top n topics according to a descending order of browsing probability of the user, n being a positive integer.

Here that the server determines, according to a preset label-topic correspondence, and by using the label corresponding to each network service used by the user, first n topics corresponding to the user includes:

Step 208a: The server queries a topic corresponding to each label from the label-topic correspondence.

The label-topic correspondence includes: a correspondence between each label and each topic, and a probability that each label belongs to a corresponding topic.

For example, the preset label-topic correspondence may be the matrix A shown in FIG. 3, and a topic corresponding to each label when a user browses online videos may be obtained through querying, that is:

Blind Detective {Andy Lau, action};

where the label "Andy Lau" belongs to the topics topic1 and topic2, and "action" belongs to the topics topic1 and topic3;

Firestorm {Andy Lau, action};

where the label "Andy Lau" belongs to the topics topic1 and topic2, and "action" belongs to the topics topic1 and topic3;

Captain America 2 {Chris Evans, action};

where the label "Chris Evans" belongs to the topics topic1 and topic2, and "action" belongs to the topics topic1 and topic3; where the label "Andy Lau" here corresponds to a probability value of 0.4 in the topic topic1 ; the label "Andy Lau" corresponds to a probability value of 0.3 in the topic topic2; "Chris Evans" belongs to the topic topic1, and corresponds to a probability value of 0.4; "Chris Evans" belongs to the topic topic2, and corresponds to a probability value of 0.3; the label "action" corresponds to a probability value of 0.3 in the topic topic1 ; and "action" corresponds to a probability value of 0.4 in the topic topic3; and You Are the Apple of My Eye {Ko Chen-tung, drama} where the label "drama" corresponds to a probability value of 0.3 in the topic topic2; and "drama" corresponds to a probability value of 0.4 in the topic topic4.

Step 208b: The server adds, for each found topic, probabilities corresponding to labels that belong to a same topic, to obtain a probability value of the topic.

According to the topic corresponding to each label found in Step 208a, probabilities corresponding to labels that belong to the topic topic1 are added to obtain that the probability of the topic topic1 is 2.1, that is:

the label "Andy Lau" in Blind Detective belongs to topic1, and the probability value corresponding to "Andy Lau" is 0.4; the label "action" belongs to topic1, and the probability value corresponding to "action" is 0.3;

the label "Andy Lau" in Firestorm belongs to topic1, and the probability value corresponding to "Andy Lau" is 0.4; the label "action" belongs to topic1, and the probability value corresponding to "action" is 0.3; and the label "Chris Evans" in Captain America 2 belongs to topic1, and the probability value corresponding to "Chris Evans" is 0.4; the label "action" belongs to topic1, and the probability value corresponding to "action" is 0.3.

Therefore, the server adds the probabilities corresponding to the labels that belong to the topic topic1 to obtain: 0.4+0.4+0.4+0.3+0.3+0.3=2.1.

Probabilities corresponding to labels that belong to the topic topic2 are added to obtain that the probability of the topic topic2 is 2.4, that is:

the label "Andy Lau" in Blind Detective belongs to topic2, and the probability value corresponding to "Andy Lau" is 0.3; the label "action" belongs to topic2, and the probability value corresponding to "action" is 0.4;

the label "Andy Lau" in Firestorm belongs to topic2, and the probability value corresponding to "Andy Lau" is 0.3; the label "action" belongs to topic2, and the probability value corresponding to "action" is 0.4; and the label "Chris Evans" in Captain America 2 belongs to topic2, and the probability value corresponding to "Chris Evans" is 0.3; the label "action" belongs to topic2, and the probability value corresponding to "action" is 0.4; and the label "drama" in You Are the Apple of My Eye belongs to topic2, and the probability value corresponding to "drama" is 0.3.

Therefore, the server adds the probabilities corresponding to the labels that belong to the topic topic2 to obtain: 0.3+0.4+0.3+0.4+0.3+0.4+0.3=2.4.

Probabilities corresponding to labels that belong to the topic topic3 are added, to obtain that the probability of the topic topic3 is 1.2, that is:

the label "action" in Blind Detective belongs to topic3, and the probability value corresponding to "action" is 0.4;

the label "action" in Firestorm belongs to topic3, and the probability value corresponding to "action" is 0.4; and the label "action" in Captain America 2 belongs to topic3, and the probability value corresponding to "action" is 0.4.

Therefore, the server adds the probabilities corresponding to the labels that belong to the topic topic3 to obtain: 0.4+0.4+0.4=1.2.

Probabilities corresponding to labels that belong to the topic topic4 are added to obtain that the probability of the topic topic4 is 0.4, that is:

the label "drama" in You Are the Apple of My Eye belongs to topic4, and the probability value corresponding to "drama" is 0.4.

Therefore, the server adds the probabilities corresponding to the labels that belong to the topic topic4 to obtain that: 0.4.

Step 208c: The server arranges the topics according to a descending order of probability value, to obtain first n topics corresponding to the user.

Here, the probability values corresponding to the topics topic1, topic2, topic3, and topic topic4 are arranged in a descending order according to the results in Step 208b to obtain that:

first, the probability value of topic2 is 2.4;
second, the probability value of topic1 is 2.1;
third, the probability value of topic3 is 1.2; and
fourth, the probability value of topic4 is 0.4.

It is set that n is 3, and it is obtained from the above that the first 3 topics corresponding to the user are the topics topic1, topic2, and topic3.

Step 209: Acquire, according to a preset topic-network service correspondence, respective corresponding recommended network service lists of the first n topics.

The recommended network service list of each topic includes at least one network service.

With reference to the first n topics corresponding to the user obtained in Step 208c, that is, topic1, topic2, and topic3, and according to Step 206, it is obtained through querying that a recommended network service list corresponding to topic1 Table 1, a recommended network service list corresponding to topic2 is Table 2, and a recommended network service list corresponding to topic3 is Table 3.

Step 210: Recommend a network service to the user according to the respective corresponding recommended network service lists of the first n topics.

Here network services to be recommended to the user are obtained according to Step 209, where the network services are, in the recommended network service list corresponding to the topic topic1, the movie Captain America that ranks the first, the movie A Simple Life that ranks the second, and the movie Running Out of Time that ranks the third; in the recommended network service list corresponding to the topic topic2, the movie Lock, Stock and Two Smoking Barrels that ranks the first; and in the recommended network service list corresponding to the topic topic3, the movie Captain America that ranks the first, the movie Running Out of Time that ranks the second, and the movie Infernal Affairs that ranks the third.

Alternatively, the server recommends to the user the movies that rank the first N in the recommended network service list, where N≥1 and N is an integer.

For example,
respective corresponding recommended network service lists of 3 topics are obtained according to Step 206, and in Step 209, the movies that rank the first 3 in the recommended network service lists corresponding to each topic may be recommended to the user according to the respective corresponding recommended network service lists of the 3 topics, that is, Captain America, A Simple Life, Lock, Stock and Two Smoking Barrels, Running Out of Time, and Infernal Affairs are obtained.

Here the number of selected topics, the number of movies in the recommended network service list corresponding to each topic, and first N movies selected from each recommended network service list are described by using an example of implementation of the network recommendation method provided in the embodiment of the present invention, and are not specifically limited.

Here, a recommendation process of recommending a network service to a user may be completed.

Figure 4:
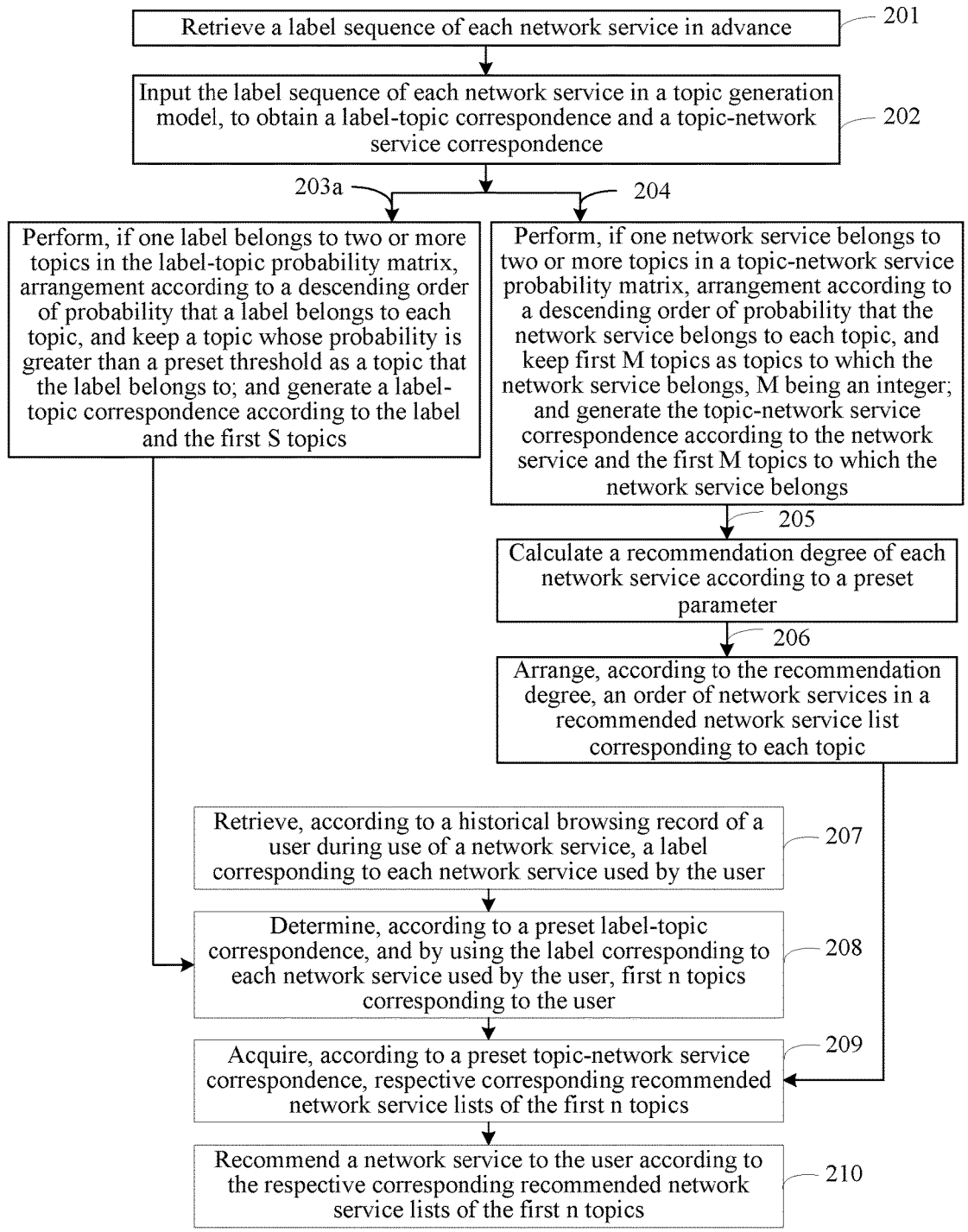
FIG. 4 is a method flowchart of another network service recommendation method provided in another embodiment of the present invention.

As another possible implementation manner, referring to FIG. 4, an alternative method for Step 203 may be:

Step 203a: Perform, one label belongs to two or more topics in the label-topic probability matrix, arrangement according to a descending order of probability that a label belongs to each topic, and keep a topic whose probability is greater than a preset threshold as a topic that the label belongs to; and generate a label-topic correspondence according to the label and the first S topics.

Here the matrix A shown on the right side of the arrow in Step 202 in FIG. 3 is used as an example for description. It is set that the threshold is 0.3, a topic whose probability is greater than 0.3 is taken as a topic to which a label belongs, and therefore it is obtained according to the matrix A in FIG. 3 that the label "Chris Evans" belongs to the topic topic1 (the corresponding probability is 0.4), the label "Andy Lau" belongs to the topic topic1 (the corresponding probability is 0.4), the label "Jason Statham" belongs to the topic topic2 (the corresponding probability is 0.4), the label "action" belongs to the topic topic3 (the corresponding probability is 0.4), the label "comedy" belongs to the topic topic4 (the corresponding probability is 0.4), and the label "drama" belongs to the topic topic4 (the corresponding probability is 0.4).

It is obtained from the above that the label-topic correspondence is:

The topic topic1 includes: "Chris Evans" and "Andy Lau".

The topic topic2 includes: "Jason Statham".

The topic topic3 includes: "action".

The topic topic4 includes: "comedy" and "drama".

Compared with Step 203, the number of labels distributed in each topic in Step 203a is more even than the number of labels distributed in each topic in Step 203, and a case in which multiple labels gather at a few topics is avoided.

Figure 5:
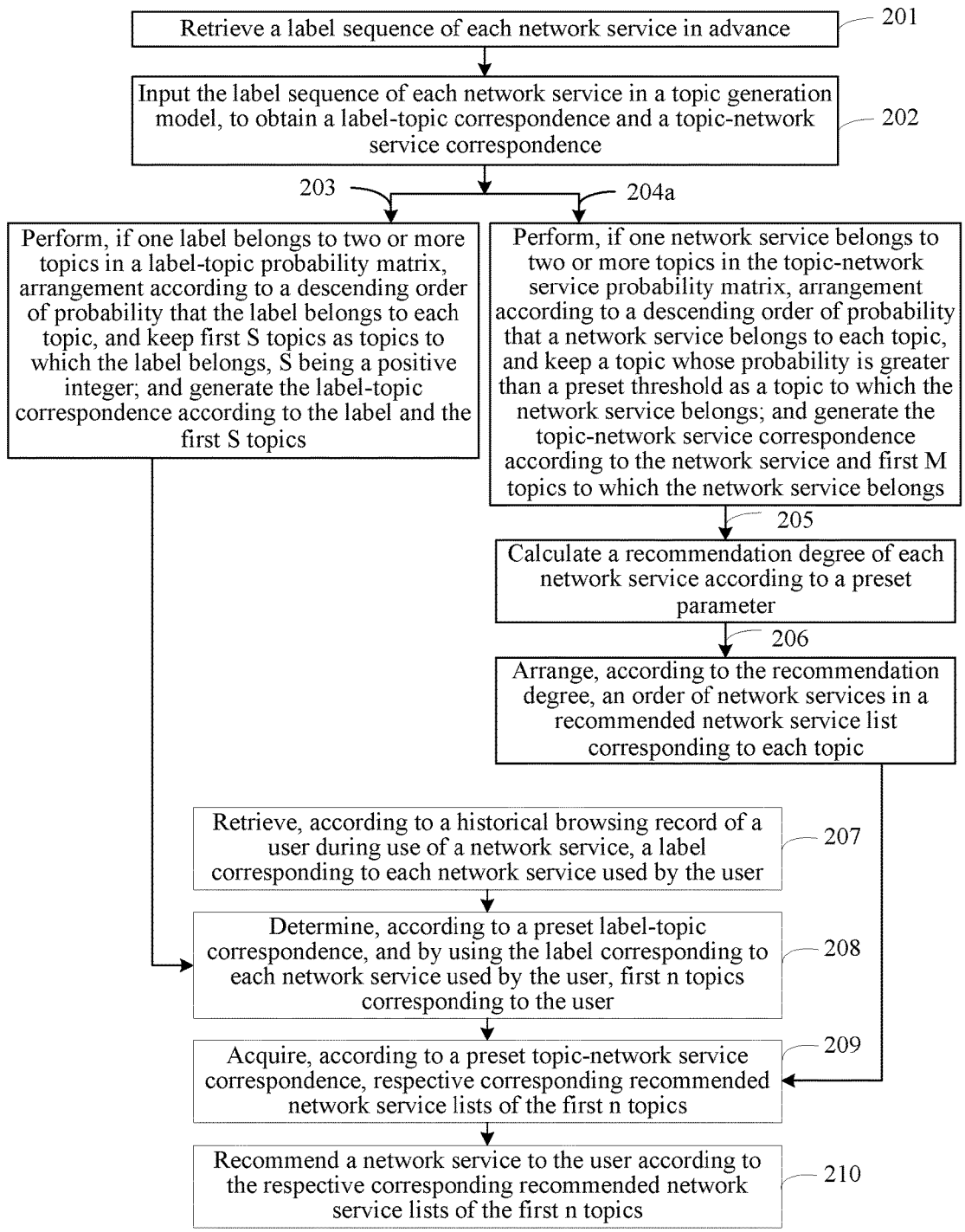
FIG. 5 is a method flowchart of still another network service recommendation method provided in another embodiment of the present invention.

As another possible implementation manner, referring to FIG. 5, an alternative method for Step 204 is:

Step 204a: Perform, if one network service belongs to two or more topics in the topic-network service probability matrix, arrangement according to a descending order of probability that a network service belongs to each topic, and keep a topic whose probability is greater than a preset threshold as a topic to which the network service belongs; and generate the topic-network service correspondence according to the network service and first M topics to which the network service belongs.

Here the matrix B shown on the right side of the arrow in FIG. 3 in Step 202 is used as an example for description. It is set that the threshold is 0.3, a topic whose probability is greater than 0.3 is taken as a topic to which a network service belongs, and therefore it is obtained according to the matrix B shown in FIG. 3 that, the movie Captain America belongs to the topic topic1 (the corresponding probability is 0.4), the movie Lock, Stock and Two Smoking Barrels belongs to the topic topic2 (the corresponding probability is 0.4), the movie Running Out of Time belongs to topic3 (the corresponding probability is 0.4), the movie Infernal Affairs belongs to topic4 (the corresponding probability is 0.4), and the movie A Simple Life belongs to the topic topic1 (the corresponding probability is 0.4).

It is obtained from the above that the topic-network service correspondence is:

The topic topic1 includes: Captain America and A Simple Life.

The topic topic2 includes: Lock, Stock and Two Smoking Barrels.

The topic topic3 includes: Running Out of Time.

The topic topic4 includes: Infernal Affairs.

Compared with Step 204, the number of movies distributed in each topic in Step 204a is more even than the number of movies distributed in each topic in Step 204, and a case in which multiple movies gather at a few topics is avoided.

Here, in addition to the methods separately shown in FIG. 4 and FIG. 5, in the solution provided in the embodiment of the present invention, Step 203a and Step 204a may also be combined to implement the network recommendation method provided in the present disclosure.

Figure 6:
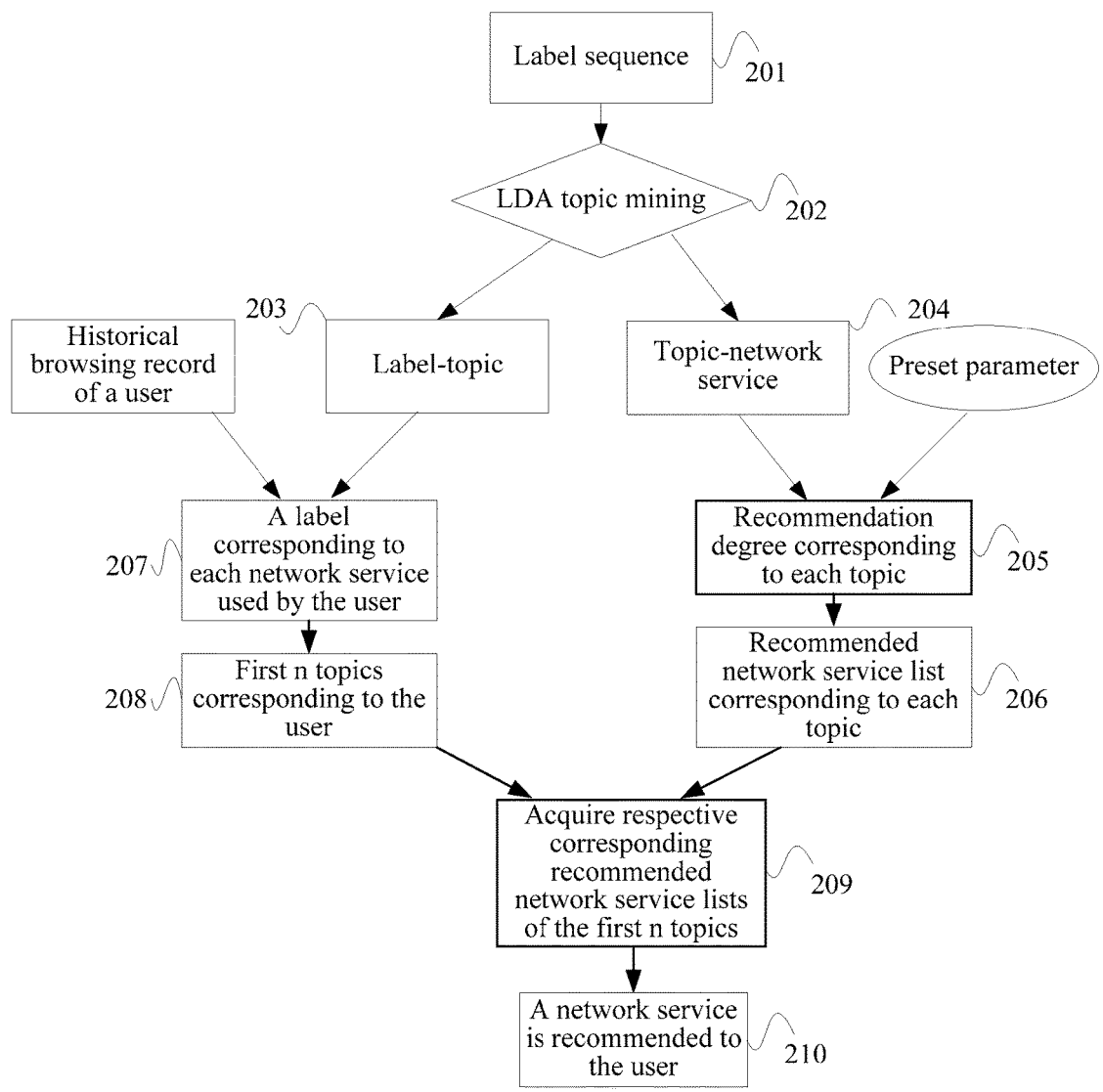
FIG. 6 is a method flowchart of yet another network service recommendation method provided in another embodiment of the present invention.

A schematic flowchart of the method of Step 201 to Step 210 in the embodiment provided in the present disclosure may be shown in FIG. 6.

Similarly, when a television program is recommended to a user, a television program corresponding to interest of the user can also be provided for the user according to the network service recommendation method provided in the embodiment of the present invention, and specifics are no longer provided.

When a user does online shopping, the number of times of browsing corresponding to multiple commodities may be acquired according to a record of browsed commodities, and results same as those of movie recommendation provided in the embodiment of the present invention may further be obtained by using each label corresponding to each commodity and a relationship between each label and each commodity. The case is the same with online reading, and is no longer elaborated here.

In conclusion, in the network service recommendation method provided in this embodiment, first n topics corresponding to a user are obtained according to a historical browsing record of the user, where the first n topics are top n topics according to a descending order of browsing probability of the user, and can reflect interest of the user during use of a network service; by using recommended network service lists corresponding to the first n topics, a network service is further recommended to a user according to recommended network service lists corresponding to the first n topics; a problem that an accuracy rate of recommending a network service to a single user is reduced because a backend system recommends a network service to a single user according to an interest standard of an entire user group is solved; and an accuracy rate of recommending a network service to a single user is increased.

Moreover, by using a set threshold, a topic whose probability is greater than a preset threshold is kept as a topic to which a network service belongs, so that it is avoided that multiple network services gather at a few topics.

Figure 7:
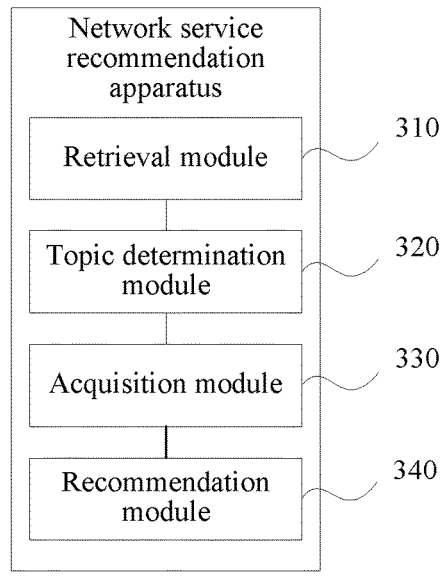
FIG. 7 is a structural block diagram of a network service recommendation apparatus provided in an embodiment of the present invention.

Referring to FIG. 7, FIG. 7 is a structural block diagram of a network service recommendation apparatus provided in an embodiment of the present invention. The network service recommendation apparatus includes: a retrieval module 310, a topic determination module 320, an acquisition module 330, and a recommendation module 340.

The retrieval module 310 is configured to retrieve, according to a historical browsing record of a user during use of a network service, a label corresponding to each network service used by the user;

The topic determination module 320 is configured to determine, according to a preset label-topic correspondence, and by using the label that is retrieved by the retrieval module 310 and corresponds to each network service used by the user, first n topics corresponding to the user, the first n topics being top n topics according to a descending order of browsing probability of the user, and n being a positive integer.

The acquisition module 330 is configured to acquire, according to a preset topic-network service correspondence, respective corresponding recommended network service lists of the first n topics determined by the topic determination module 320, the recommended network service list of each topic including at least one network service.

The recommendation module 340 is configured to recommend a network service to the user according to the respective corresponding recommended network service lists, of the first n topics, acquired by the acquisition module 330.

In conclusion, in the network service recommendation apparatus provided in this embodiment, first n topics corresponding to a user are obtained according to a historical browsing record of the user, where the first n topics are top n topics according to a descending order of browsing probability of the user, and can reflect interest of the user during use of a network service; by using recommended network service lists corresponding to the first n topics, a network service is further recommended to a user according to recommended network service lists corresponding to the first n topics; a problem that an accuracy rate of recommending a network service to a single user is reduced because a backend system recommends a network service to a single user according to an interest standard of an entire user group is solved; and an accuracy rate of recommending a network service to a single user is increased.

Figure 8:
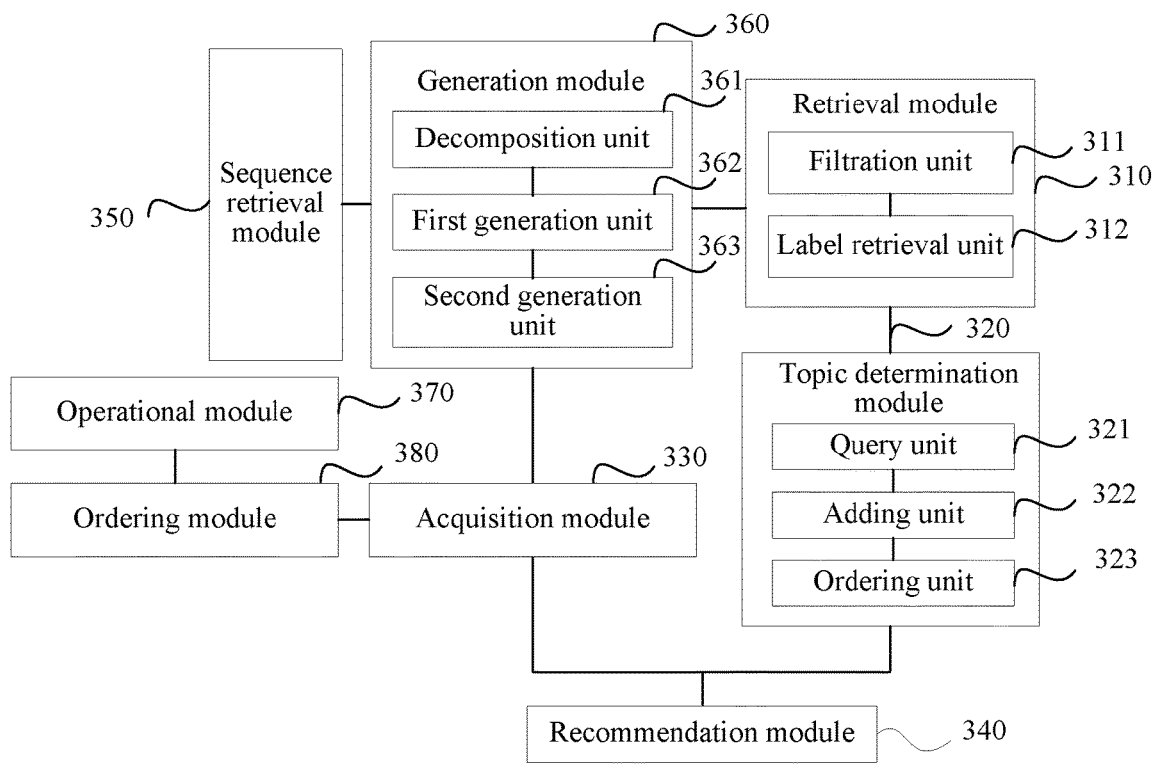
FIG. 8 is a structural block diagram of a network service recommendation apparatus provided in another embodiment of the present invention.

Referring to FIG. 8, FIG. 8 is a structural block diagram of a network service recommendation apparatus provided in another embodiment of the present invention. The network service recommendation apparatus includes: a retrieval module 310, a topic determination module 320, an acquisition module 330, a recommendation module 340, a sequence retrieval module 350, a generation module 360, an operational module 370, and an ordering module 380.

Theسequence retrieval module 350 is configured to retrieve a label sequence of each network service in advance, the label sequence of each network service including at least one label corresponding to the network service.

The generation module 360 is configured to input, the label sequence, of each network service, retrieved by the sequence retrieval module 350, in a topic generation model, to obtain a label-topic correspondence and a topic-network service correspondence.

Optionally, the generation module 360 includes:

a decomposition unit 361, configured to input the label sequence of each network service in a topic generation model, for example, an LDA, to obtain a label-topic probability matrix and a topic-network service probability matrix, the label-topic probability matrix including at least one topic, a label corresponding to each topic, and a probability that each label belongs to a corresponding topic; and the topic-network service probability matrix including at least one topic, a network service corresponding to each topic, and a probability that each network service belongs to a corresponding topic; and a first generation unit 362, configured to generate the label-topic correspondence according to the label-topic probability matrix obtained by the decomposition unit 361.

Furthermore, the first generation unit 362 is configured to perform, if one label belongs to two or more topics in the topic-network service probability matrix, arrangement according to a descending order of probability that a label belongs to each topic, and keep first S topics as topics to which the label belongs, S being a positive integer; and generate the label-topic correspondence according to the label and the first S topics;

or, the first generation unit 362 is configured to perform, if one label belongs to two or more topics in the topic-network service probability matrix, arrangement according to a descending order of probability that the label belongs to each topic, and keep a topic whose probability is greater than a preset threshold as a topic to which the label belongs; and generate the label-topic correspondence according to the label and the first S topics.

The second generation unit 363 is further configured to generate the topic-network service correspondence according to the topic-network service probability matrix obtained by the decomposition unit 361.

Furthermore, the second generation unit 363 is configured to perform, if one network service belongs to two or more topics in the topic-network service probability matrix, arrangement according to a descending order of probability that the network service belongs to each topic, and keep first M topics as topics to which the network service belongs, where M≥1 and M is an integer; and generate the topic-network service correspondence according to the network service and the first M topics to which the network service belongs;

or, the second generation unit 363 is configured to perform, if one network service belongs to two or more topics in the topic-network service probability matrix, arrangement according to a descending order of probability that a network service belongs to each topic, and keep a topic whose probability is greater than a preset threshold as a topic to which a network service belongs; and generate the topic-network service correspondence according to the network service and the first M topics to which the network service belongs.

The retrieval module 310 is configured to retrieve, according to a historical browsing record of a user during use of a network service, a label corresponding to each network service used by the user.

Optionally, the retrieval module 310 includes:

a filtration unit 311, configured to determine a network service, meeting an effective browsing condition, in the historical browsing record, the effective browsing condition including that: browsing duration exceeds predetermined duration, and/or, the number of times of browsing exceeds a predetermined number of times; and a label retrieval unit 312, configured to retrieve a label corresponding to the network service meeting the effective browsing condition.

The topic determination module 320 is configured to determine, according to a preset label-topic correspondence, and by using the label that is retrieved by the retrieval module 310 and corresponds to each network service used by the user, first n topics corresponding to the user, the first n topics being top n topics according to a descending order of browsing probability of the user, and n being a positive integer.

Optionally, the topic determination module 320 includes:

a query unit 321, configured to query a topic corresponding to each label from a label-topic correspondence, the label-topic correspondence including: a correspondence between each label and each topic, and a probability that each label belongs to a corresponding topic;

an adding unit 322, configured to add, for each topic found by the query unit 321, probabilities corresponding to labels that belong to the topic, to obtain the probability value of the topic; and an ordering unit 323, configured to arrange each topic according to a descending order of probability value, to obtain first n topics corresponding to the user.

The operational module 370 is configured to calculate a recommendation degree of each network service according to a preset parameter, the preset parameter including: at least one of a probability that the network service belongs to a corresponding topic, the number of times of browsing corresponding to the network service, a public rating of the network service, and duration that the network service has been released.

The ordering module 380 is configured to arrange, according to the recommendation degree, an order of network services in the recommended network service list corresponding to each topic.

The acquisition module 330 is configured to acquire, according to a preset topic-network service correspondence, respective corresponding recommended network service lists, of the first n topics, determined by the topic determination module 320, the recommended network service list of each topic including at least one network service.

The recommendation module 340 is configured to recommend a network service to the user according to the respective corresponding recommended network service lists, of the first n topics, acquired by the acquisition module 330.

In conclusion, in the network service recommendation apparatus provided in this embodiment, first n topics corresponding to a user are obtained according to a historical browsing record of the user, where the first n topics are top n topics according to a descending order of browsing probability of the user, and can reflect interest of the user during use of a network service; by using recommended network service lists corresponding to the first n topics, a network service is further recommended to a user according to recommended network service lists corresponding to the first n topics; a problem that an accuracy rate of recommending a network service to a single user is reduced because a backend system recommends a network service to a single user according to an interest standard of an entire user group is solved; and an accuracy rate of recommending a network service to a single user is increased.

Moreover, a threshold is set to keep a topic whose probability is greater than a preset threshold as a topic to which a network service belongs, so that it is avoided that multiple network services gather at a few topics.

Figure 9:
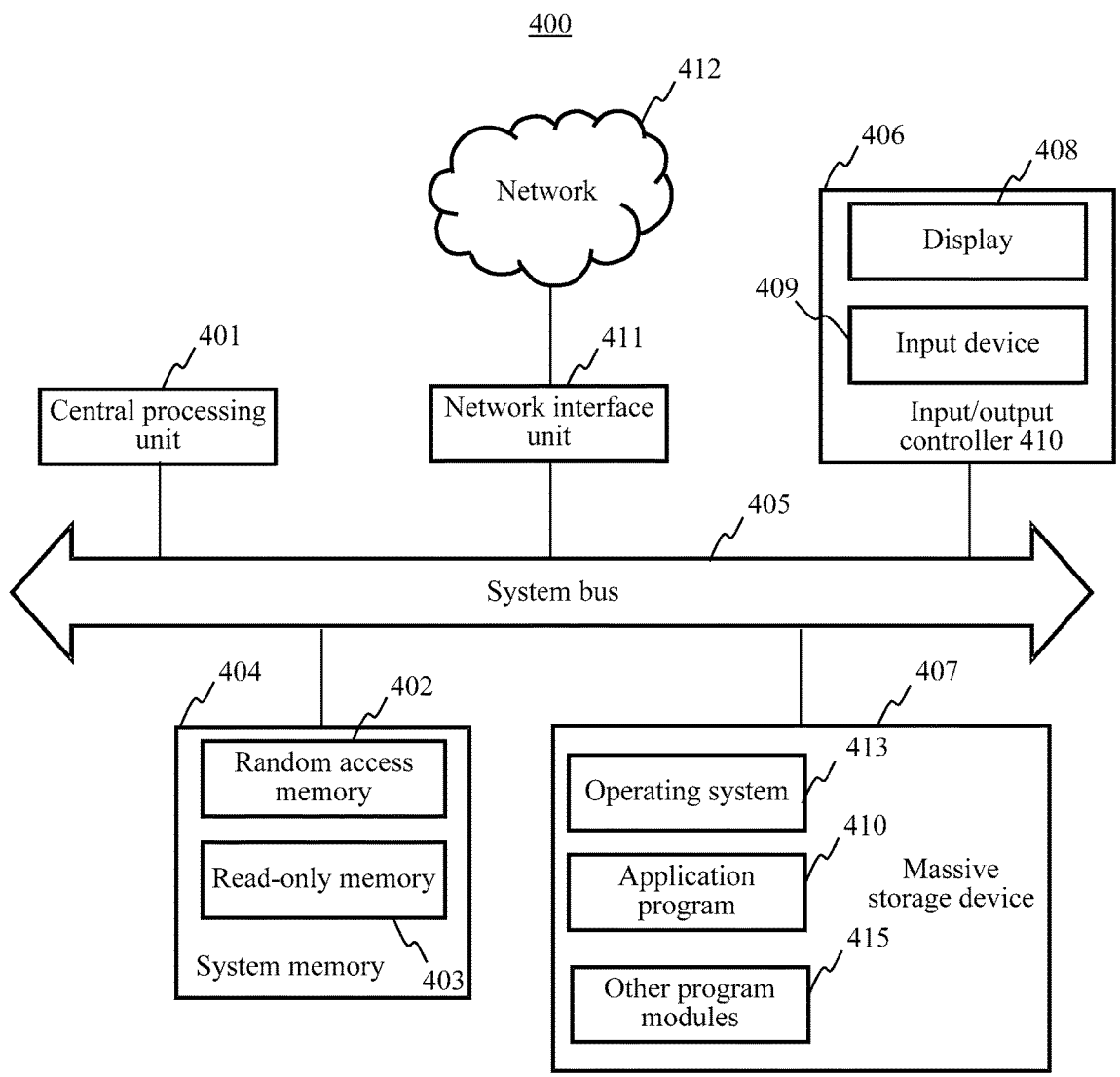
FIG. 9 is a schematic structural diagram of a server provided in an embodiment of the present invention.

Referring to FIG. 9, FIG. 9 is a schematic structural diagram of a server provided in an embodiment of the present invention. The server 400 includes a central processing unit (CPU) 401, a system memory 404 including a random access memory (RAM) 402 and a read-only memory (ROM) 403, and a system bus 405 connecting the system memory 404 and the CPU 401. The server 400 further includes a basic input/output (I/O) system 406 for helping transmission of information between devices in a computer, and a massive storage device 407 configured to store an operating system 413, an application program 410, and other program modules 415.

The basic input/output system 406 includes a display 408 configured to display information and an input device 409 such as a mouse and a keyboard configured to input information by a user. The display 408 and the input device 409 are both connected to an input/output controller 410 of the system bus 405 to be connected to the CPU 401. The basic input/output system 406 may further include an input/output controller 410 configured to receive and process input from multiple other devices such as a keyboard, a mouse or an electronic stylus. Similarly, the input/output controller 410 further provides output to a display screen, a printer or an output device of another type.

The massive storage device 407 is connected to a massive storage controller (not shown) of the system bus 405 to be connected to the CPU 401. The massive storage device 407 and its related computer readable medium provide the server 400 with non-volatile storage. That is, the massive storage device 407 may include a computer readable medium (not shown) such as a hard drive or a CD-ROM drive.

Without loss of generality, the computer readable media include computer storage media and communications media. The computer storage media include volatile and non-volatile, and removable and non-removable media implemented in any method or technology for storage of information such as computer-readable instructions, data structures, program modules or other data. The computer storage media include, but are not limited to, a RAM, a read-only memory (ROM), an electrically erasable programmable ROM (EEPROM), a flash memory or other solid-state memory technologies, compact disc ROM (CD-ROM), a digital versatile disk (DVD) or other optical storage devices, and a magnetic cassette, a magnetic tape, a magnetic disk storage device or other magnetic storage devices. Certainly, the person of ordinary skill in the art may know that the computer storage medium is not limited to the foregoing types. The system memory 404 and the massive storage device 407 may be generally referred to as a memory.

According to various embodiments of the present invention, the server 400 may further run on a remote computer connected to a network by using a network such as the Internet. That is, the server 400 may be connected to a network 412 by using a network interface unit 411 connected to the system bus 405, or may also be connected to a network or a remote computer system (not shown) of another type by using a network interface unit 411.

The memory may further include one or more programs. The one or more programs are stored in the memory. The processor is configured to perform, according to the programs stored in the memory, the foregoing network service recommendation method.

The sequence numbers of the above embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of the present invention, but are not intended to limit the present invention. Any modification, equivalent replacement, or improvement made within the spirit and principle of the present invention shall fall within the protection scope of the present invention.

What is claimed is:

1. A network service recommendation method, wherein the method comprises:
retrieving, according to a historical browsing record of a user during use of a network service, a label corresponding to each network service used by the user;
determining, according to a label-topic correspondence, and by using the label corresponding to each network service used by the user, first n topics corresponding to the user, the first n topics being top n topics according to a descending order of browsing probability of the user, and n being a positive integer;
acquiring, according to a topic-network service correspondence, respective corresponding recommended network service lists of the first n topics, the recommended network service list of each topic comprising at least one network service; and
recommending a network service to the user according to the respective corresponding recommended network service lists of the first n topics.

2. The method according to claim 1, before the retrieving, according to a historical browsing record of a user during use of a network service, a label corresponding to each network service used by the user, further comprising:
retrieving a label sequence of each network service in advance, the label sequence of each network service comprising at least one label corresponding to the network service;
inputting the label sequence of each network service in a topic generation model, to obtain the label-topic correspondence and the topic-network service correspondence.

3. The method according to claim 2, wherein the inputting the label sequence of each network service in a topic generation model, to obtain the label-topic correspondence and the topic-network service correspondence comprises:
inputting the label sequence of each network service in a latent Dirichlet allocation (LDA) model, to obtain a label-topic probability matrix and a topic-network service probability matrix, the label-topic probability matrix comprising at least one topic, a label corresponding to each topic, and a probability that each label belongs to a corresponding topic; and the topic-network service probability matrix comprising at least one topic, a network service corresponding to each topic, and a probability that each network service belongs to a corresponding topic;
generating the label-topic correspondence according to the label-topic probability matrix; and
generating the topic-network service correspondence according to the topic-network service probability matrix.

4. The method according to claim 3, wherein the generating the label-topic correspondence according to the label-topic probability matrix comprises:
performing, if one label belongs to two or more topics in the label-topic probability matrix, arrangement according to a descending order of probability that the label belongs to each topic, and keeping first S topics as topics to which the label belongs, S being a positive integer; and generating the label-topic correspondence according to the label and the first S topics;
or,
performing, if one label belongs to two or more topics in the label-topic probability matrix, arrangement according to a descending order of probability that the label belongs to each topic, and keeping topics whose probabilities are greater than a preset threshold as topics to which the label belongs; and generating the label-topic correspondence according to the label and the first S topics.

5. The method according to claim 3, wherein the generating the topic-network service correspondence according to the topic-network service probability matrix comprises:
performing, if one network service belongs to two or more topics in the topic-network service probability matrix, arrangement according to a descending order of probability that the network service belongs to each topic, and keeping first M topics as topics to which the network service belongs, M being a positive integer; and generating the topic-network service correspondence according to the network service and the first M topics to which the network service belongs;

or, performing, if one network service belongs to two or more topics in the topic-network service probability matrix, arrangement according to a descending order of probability that the network service belongs to each topic, and keeping topics whose probabilities are greater than a preset threshold as topics to which the network service belongs; and generating the topic-network service correspondence according to the network service and the first M topics to which the network service belongs.

6. The method according to claim 1, wherein the retrieving, according to a historical browsing record of a user during use of a network service, a label corresponding to each network service used by the user comprises:

determining a network service, meeting an effective browsing condition, in the historical browsing record, the effective browsing condition comprising that: browsing duration exceeds predetermined duration, and/or, the number of times of browsing exceeds a predetermined number of times; and retrieving a label corresponding to the network service meeting the effective browsing condition.

7. The method according to claim 1, wherein the determining, according to a label-topic correspondence, and by using the label corresponding to each network service used by the user, first n topics corresponding to the user comprises:

querying a topic corresponding to each label from the label-topic correspondence, the label-topic correspondence comprising: a correspondence between each label and each topic, and a probability that each label belongs to a corresponding topic;

adding, for each found topic, probabilities corresponding to labels that belong to the topic, to obtain a probability value of the topic; and arranging an order of each topic according to a descending order of probability value, to obtain the first n topics corresponding to the user.

8. The method according to claim 1, before the acquiring, according to a topic-network service correspondence, respective corresponding recommended network service lists of the first n topics, further comprising:

calculating a recommendation degree of each network service according to a preset parameter, the preset parameter comprising: at least one of a probability that the network service belongs to a corresponding topic, the number of times of browsing corresponding to the network service, a public rating of the network service, and duration that the network service has been released; and arranging an order, according to the recommendation degree, of a network service in the recommended network service list corresponding to each topic.

9. A network service recommendation apparatus, wherein the apparatus comprises:

a retrieval module, configured to retrieve, according to a historical browsing record of a user during use of a network service, a label corresponding to each network service used by the user;

a topic determination module, configured to determine, according to a label-topic correspondence, and by using the label that is retrieved by the retrieval module and corresponds to each network service used by the user, first n topics corresponding to the user, the first n topics being top n topics according to a descending order of browsing probability of the user, and n being a positive integer;

an acquisition module, configured to acquire, according to a topic-network service correspondence, respective corresponding recommended network service lists of the first n topics determined by the topic determination module, the recommended network service list of each topic comprising at least one network service; and a recommendation module, configured to recommend a network service to the user according to the respective corresponding recommended network service lists, of the first n topics, acquired by the acquisition module.

10. The apparatus according to claim 9, wherein the apparatus further comprises:

a sequence retrieval module, configured to retrieve, before the label corresponding to each network service used by the user is retrieved according to the historical browsing record of the user during use of the network service, a label sequence of each network service in advance, the label sequence of each network service comprising at least one label corresponding to the network service; and a generation module, configured to input the label sequence, of each network service, retrieved by the sequence retrieval module, in a topic generation model, to obtain the label-topic correspondence and the topic-network service correspondence.

11. The apparatus according to claim 10, wherein the generation module comprises:

a decomposition unit, configured to input the label sequence of each network service in a latent Dirichlet allocation (LDA) model, to obtain a label-topic probability matrix and a topic-network service probability matrix, the label-topic probability matrix comprising at least one topic, a label corresponding to each topic, and a probability that each label belongs to a corresponding topic; and the topic-network service probability matrix comprising at least one topic, a network service corresponding to each topic, and a probability that each network service belongs to a corresponding topic;

a first generation unit, configured to generate the label-topic correspondence according to the label-topic probability matrix obtained by the decomposition unit; and a second generation unit, further configured to generate the topic-network service correspondence according to the topic-network service probability matrix obtained by the decomposition unit.

12. The apparatus according to claim 11, wherein, the first generation unit is configured to perform, if one label belongs to two or more topics in the label-topic probability matrix, arrangement according to a descending order of probability that the label belongs to each topic, and keep first S topics as topics to which the label belongs, S being a positive integer; and generate the label-topic correspondence according to the label and the first S topics;

or, the first generation unit is configured to perform, if one label belongs to two or more topics in the label-topic probability matrix, arrangement according to a descending order of probability that the label belongs to each topic, and keep topics whose probabilities are greater than a preset threshold as topics to which the label belongs; and generate the label-topic correspondence according to the label and the first S topics.

13. The apparatus according to claim 11, wherein,
the second generation unit is configured to perform, if one network service belongs to two or more topics in the topic-network service probability matrix, arrangement according to a descending order of probability that the network service belongs to each topic, and keep first M topics as topics to which the network service belongs, wherein M≥1 and M is an integer; and generate the topic-network service correspondence according to the network service and the first M topics to which the network service belongs;

or, the second generation unit is configured to perform, if one network service belongs to two or more topics in the topic-network service probability matrix, arrangement according to a descending order of probability that the network service belongs to each topic, and keep topics whose probabilities are greater than a preset threshold as topics to which the network service belongs; and generate the topic-network service correspondence according to the network service and the first M topics to which the network service belongs.

14. The apparatus according to claim 9, wherein the retrieval module comprises:

a filtration unit, configured to determine a network service, meeting an effective browsing condition, in the historical browsing record, the effective browsing condition comprising that: browsing duration exceeds predetermined duration, and/or, the number of times of browsing exceeds a predetermined number of times; and a label retrieval unit, configured to retrieve a label corresponding to the network service meeting the effective browsing condition.

15. The apparatus according to claim 9, wherein the topic determination module comprises:

a query unit, configured to query a topic corresponding to each label from the label-topic correspondence, the label-topic correspondence comprising: a correspondence between each label and each topic, and a probability that each label belongs to a corresponding topic;

an adding unit, configured to add, each topic found by the query unit, probabilities corresponding to labels that belong to the topic, to obtain a probability value of the topic; and an ordering unit, configured to arrange an order of each topic according to a descending order of probability value, to obtain the first n topics corresponding to the user.

16. The apparatus according to claim 9, wherein the apparatus further comprises:

an operational module, configured to calculate, before respective corresponding recommended network service lists of the first n topics are acquired according to the topic-network service correspondence, a recommendation degree of each network service according to a preset parameter, the preset parameter comprising: at least one of a probability that the network service belongs to a corresponding topic, the number of times of browsing corresponding to the network service, a public rating of the network service, and duration that the network service has been released; and an ordering module, configured to arrange an order, according to the recommendation degree, of a network service in the recommended network service list corresponding to each topic.

* * * * *